United States Patent [19]
Butt et al.

[11] Patent Number: 6,047,390
[45] Date of Patent: *Apr. 4, 2000

[54] MULTIPLE CONTEXT SOFTWARE ANALYSIS

[75] Inventors: Farooq Butt; Roger Smith; Katherine E. Stewart, all of Austin, Tex.

[73] Assignee: Motorola, Inc., Schaumburg, Ill.

[*] Notice: This patent is subject to a terminal disclaimer.

[21] Appl. No.: 08/995,359

[22] Filed: Dec. 22, 1997

[51] Int. Cl.⁷ ..................................................... G06F 11/00
[52] U.S. Cl. ............................................. 714/43; 395/675
[58] Field of Search .................................. 714/43, 26, 38, 714/39, 41, 45, 47, 11, 12, 31, 37; 395/675, 677, 568, 569, 678, 680; 364/246, 550, 568

[56] References Cited

U.S. PATENT DOCUMENTS

| | | | |
|---|---|---|---|
| 4,462,077 | 7/1984 | York | 364/300 |
| 5,129,077 | 7/1992 | Hillis | 395/500 |
| 5,179,702 | 1/1993 | Spix et al. | 395/650 |
| 5,212,794 | 5/1993 | Pettis et al. | 395/700 |
| 5,333,304 | 7/1994 | Christensen et al. | 395/575 |
| 5,390,336 | 2/1995 | Hillis | 395/800 |
| 5,442,758 | 8/1995 | Slingwine | 395/375 |
| 5,485,574 | 1/1996 | Bolosky et al. | 395/183.11 |
| 5,490,249 | 2/1996 | Miller | 395/183.14 |
| 5,506,955 | 4/1996 | Chen et al. | 395/183.02 |
| 5,519,867 | 5/1996 | Moeller et al. | 395/700 |
| 5,553,235 | 9/1996 | Chen et al. | 395/182.18 |
| 5,560,011 | 9/1996 | Uyama | 395/700 |
| 5,590,056 | 12/1996 | Barritz | 364/550 |
| 5,594,904 | 1/1997 | Linnermark et al. | 395/704 |
| 5,602,729 | 2/1997 | Krueger et al. | 395/704 |
| 5,615,333 | 3/1997 | Juettner et al. | 395/183.14 |
| 5,682,328 | 10/1997 | Roeber et al. | 364/550 |
| 5,684,945 | 11/1997 | Chen et al. | 395/182.18 |
| 5,704,053 | 12/1997 | Santhannam | 284/383 |
| 5,748,878 | 5/1998 | Rees et al. | 395/183.14 |
| 5,799,143 | 8/1998 | Butt et al. | 395/183.14 |
| 5,847,972 | 12/1998 | Eick et al. | 364/514 A |

OTHER PUBLICATIONS

Silicon Graphics, "Man Page Interface for IRIX 5.2", Release 5.2, 5 pgs.

Smith, et al. "Tracing with pixie", Division of Applied Sciences, Harvard University, Version 1.1, pp. 1–29.

Wulf, "SC'95 Table of Contents by Session", Supercomputing '95 Conference Dec. 3–8, Association for Computing Machinery, Inc., 9 pgs. (1995).

Chilimbi, et al., "StormWatch: A Tool for Visualizing Memory System Protocols", AT&T Bell Laboratories, Sections 1–6, 16 pgs.

IBM Corp., "Program Visualizer (PV) Tutorial and Reference Manual", Release 0.8.1, 142 pgs.

(List continued on next page.)

*Primary Examiner*—Robert W. Beausoliel, Jr.
*Assistant Examiner*—Nadeem Iqbal
*Attorney, Agent, or Firm*—Daniel D. Hill

[57] ABSTRACT

A method for multiple context analysis of software applications in a multiprocessing (22, 23), multithreaded computer environment utilizes instrumentation code inserted (54, 55) into the applications. For each execution (67) of the application (60), a context set is selected (62). Execution of the instrumented code (67) provides information for analysis in an instrumentation buffer (82) addressed by a reserved register (80) or buffer pointer. The operating system is responsible for providing in the reserved register (80) the address of the instrumentation buffer (82) appropriate for each instrumented context executed. When the application (60) is done with an instrumentation buffer (82), the buffer may be processed by filter software (68). The combination of using a reserved register (80) and allowing the operating system to keep track of relevant context switches allows applications to be instrumented (54, 55) for various context sets without the necessity of modifying (53) or recompiling (52) the application software (60).

2 Claims, 7 Drawing Sheets

OTHER PUBLICATIONS

Eggers, et al., "Techniques for Efficient Inline Tracing on a Shared–Memory Multiprocessor", Proceedings of the 1990 ACM Sigmetrics Conference, pp. 37–47 (1990).

Kimelman, et al., "Strata–Various: Multi–Layer Visualization of Dynamics in Software System Behavior", Visualization '94 Conference, IBM Thomas J. Watson Research Center, pp. 1–14 (1994).

Stephens, et al., "Instruction Level Profiling and Evaluation of the IBM RS/6000", ACM (1991).

MULTIPLE CONTEXT SOFTWARE ANALYSIS

This is based on U.S. patent application Ser. No. 08/703,261 filed Aug. 26, 1996, which is hereby incorporated by reference, and priority thereto for common subject matter is hereby claimed.

FIELD OF THE INVENTION

The present invention generally relates to software performance analysis, and more specifically to analyzing software performance in a multiprocessor, multithreaded environment.

BACKGROUND OF THE INVENTION

Tools for analyzing the performance of software applications are an integral part of the software development process. Such tools include profilers, memory use analyzers, debuggers, and coverage tools.

Instrumenting an application to collect data for analysis is a well-known technique for single-threaded uniprocessor systems. For example, in profiling, code is instrumented by adding code to increment counters so that it is possible to reconstruct at the end of program execution how many times each basic block was executed and how many times each edge in the control flow graph was traversed.

For multi-threaded multiprocessor systems, this level of granularity may be insufficient. A particular basic block may be run in many different execution contexts during the execution of an application: on different threads, on different processors, etc. For purposes of analyzing the code, it is often desirable to know how well the execution of important blocks is balanced on different processors.

In discussing contexts, it is useful to distinguish among:
Micro-Context
A micro context of a section of application code refers to the finest-grain state of execution of that code which can be distinguished by the operating system running that application. An example would be a specific thread executing on a specific processor. Another example of a micro context could be a specific thread on a specific processor for the time span from the most recent time the thread executed on that processor until the time that it terminated or got switched to another processor.
Context
A context refers to either a micro-context or a union of micro-contexts. An example would be any thread executing on a specific processor.
Context Set
A context set is a set of disjoint contexts to be used in analyzing a particular execution of an application. Each micro-context must be included in one of these contexts. In a particular profiling run, the desired context set might be the set of contexts in which each context was the union of all threads executed on a particular processor. This would be a useful context set for helping to determine if the application were running balanced on all processors.

The use of context sets is particularly useful when it is easy to determine whether a micro context is an element of a particular context by means of a simple rule rather than by resorting to an exhaustive enumeration of the micro contexts for each context. For example, if the micro contexts are characterized by (processor, thread) pairs and the contexts are characterized by (processor), the simple rule [The (processor,thread) micro context is a member of the (processor') context if and only if processor=processor'.] is useful, because there is no need to know in advance how many threads or processors will be used in a particular execution of an application.

The current state of the art in profiling most commercial multi-processor/multi-threaded systems is to extend the uniprocessor model by inserting system calls into user code at the beginning of each piece of instrumentation code to determine the current processor and/or thread context. Since instrumentation code is executed very frequently, this overhead is highly consumptive of both space and time.

Other analysis gathering techniques for multi-processor and/or multi-threaded systems have focused on collecting extensive traces with large space and delay components. These traces generally consist of some variation of an event, program counter and addresses/data. For applications running on current systems, small amounts of runtime can generate large amounts of data very quickly. For instance, 15 seconds of PowerPC NT system level trace gathering produces 9 Gigabytes of data. Several existing systems on a variety of processors exist already that follow the strategy of analyzing performance by looking at event traces, Examples of these are MPTrace (S. J. Eggers, et al., "*Techniques for Efficient Inline Tracing on a Shared-Memory Multiprocessor*", Proceedings of the 1990 ACM SIGMETRICS Conference on Measurement and Modeling of Computer Systems, May 1990, p. 37–47), PV (D. Kimmelman, et al., "*Strata-Various: Multi-layer Visualization of Dynamics in Software System Behavior*", Proceedings of the 1994 IEEE Visualization Symposium, pp. 172–178; *Program Visualizer* (PV) *Tutorial and Reference Manual*, Release 0.8.1, PV Development, IBM Corporation, Jul. 28, 1995.) and "Storm Watch" (T. M. Chilimbi et al., "*Storm Watch: A Tool for Visualizing Memory System Protocols*", Proceedings of the 1995 ACM/IEEE Supercomputing Conference, San Diego, Calif., December 1995.) The "*Storm Watch*" paper contains a good summary of other trace-oriented systems in section 6.

In the uniprocessor domain, basic block counting tools have existed for quite a while. The first common example of such a tool was "pixie" developed by MIPS in the mid 1980's. (man page for "pixie(1)" from Silicon Graphics, release 5.2) (M. D. Smith, "Tracing with pixie", Stanford University Technical Report CSL-TR-91–97, November 1991). Another example is "goblin" (C. Stephens et al., "*Instruction Level Profiling and Evaluation on the RS/6000*", 18th International Symposium on Computer Architecture, Toronto, Canada, May 1991). These techniques are lightweight and require memory proportional to a fraction of the executable to store the results.

DETAILED DESCRIPTION OF A PREFERRED EMBODIMENT

This invention describes a method which allows a clean and efficient separation of the instrumentation and context-determination aspects involved in collecting analysis data for an execution of an application. The method is applicable to analysis needs which include incrementing basic block counters (profiling), setting break points (debugging), noting memory accesses (memory use tools), and trace generation. It permits a single instrumentation of code to allow analysis of the application under multiple context sets.

The method permits fast and efficient multiple-context analysis by separating the problem into three major parts; the instrumentation code, the context-switching part, and an interface.

With this invention, the instrumentation code is excluded from knowing what context it is working in. This gives some important advantages:

The instrumentation code is written the same no matter how large a set of contexts it might be run in. Programs don't need to be recompiled or reinstrumented to be analyzed over a different set of contexts.

The instrumentation code is not responsible for finding out what context it is in.

Space is allocated only for those contexts which actually arise during the particular execution of the application.

Collected output for a given context may be filtered, compressed, summarized, or otherwise processed as soon as the collection for that context ends.

The instrumentation code can be simple and fast.

This property is guaranteed by declaring that the instrumentation code be re-entrant. A simple implementation is to use a reserved register (Rx) as a pointer to a data area which will be used for storing "side effects" of instrumentation code, such as a table of counters for profiling. In some situations, additional registers may need to be reserved. Libraries may need to be supplied which use reserved registers in a way which is compatible with the multiple-context instrumentation.

Establishing the data area and maintaining a pointer to it in the reserved register (Rx) requires the cooperation of the operating system. It is anticipated that an application may be instrumented either by building the application in a special way, or by applying an instrumentation tool to uninstrumented executable.

The granularity and scope associated with micro contexts is determined by the operating system. This invention leaves a determination of the context and maintenance of the pointer (Rx) to a data area to the operating system.

The term "operating system" here includes the kernel, as well as any device drivers, dynamically linked drivers, and/or hooks which permit modifications to the operating system to be performed dynamically. The key reasons for performing the task of initializing a pointer register (Rx) to address a data area in the operating system are:

In typical situations, many sequences of instrumented code will be executed between context switches, so that the context-switch code will have low overhead. The operating system has greatest access to context switches, since it in effect is causing the context switches. Indeed, as will be seen later, efficiencies can be gained by inserting code implementing this invention in sections of an operating system that deal with context switches.

Security is less of an issue.

The application can be rerun selecting a different context set in each execution without the need to reinstrument the code.

Figure 1:
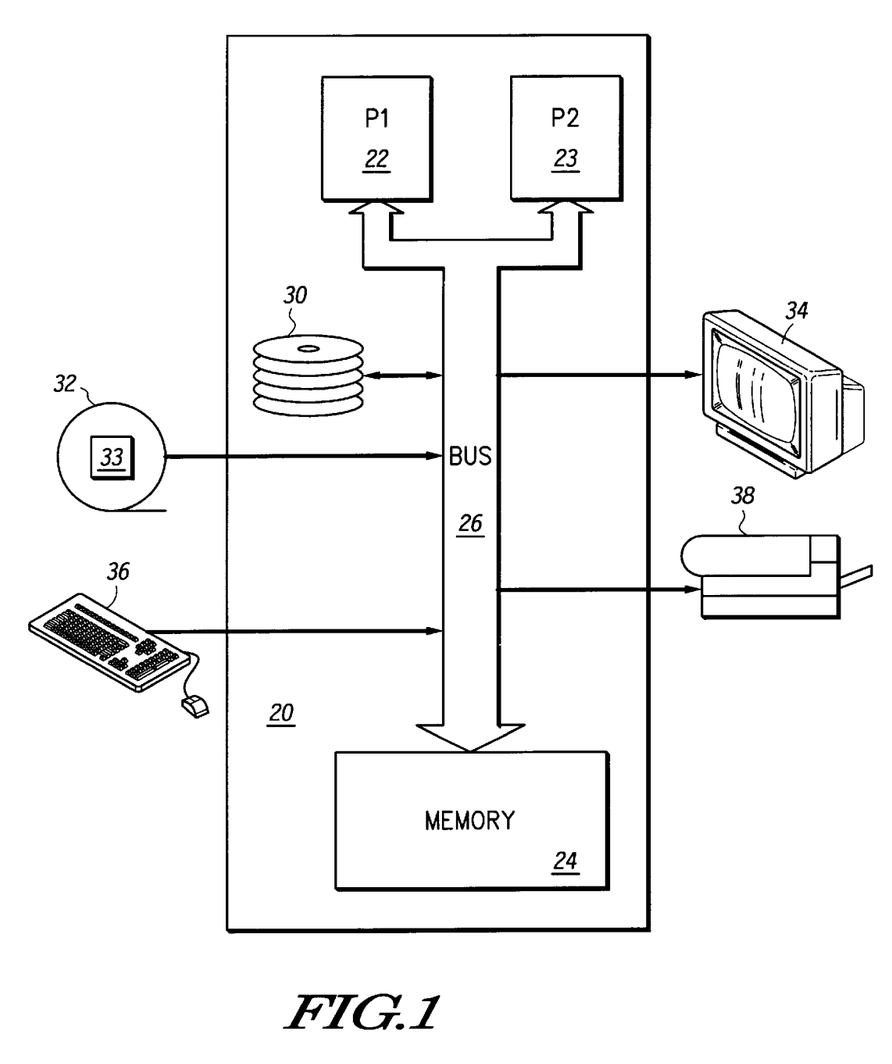
FIG. 1 is a block diagram illustrating the high level hardware components utilized in this invention.

FIG. 1 is a block diagram illustrating the high level hardware components utilized in this invention. General Purpose Computer 20 has two Computer Processors P1 22, and P2 23 and Memory 24, connected by a Bus 26. Memory 24 includes relatively high speed machine readable media such as DRAM, SRAM, ROM, FLASH, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine readable media such as hard disk drives, magnetic drum, and bubble memory. External Storage 32 includes machine readable media such as floppy disks, removable hard drives, magnetic tape, CD-ROM, and even other computers, possibly connected via a communications line. The distinction drawn here between Secondary Storage 30 and External Storage 32 is primarily for convenience in describing the invention. As such, it should be appreciated that there is substantial functional overlap between these elements. Executable versions of computer software 33, such as a source code application 50, object code application 51, instrumented application 60, instrumentation statistics 69 (see FIG. 4), and operating system (not shown) can be read from the External Storage 32 and loaded for execution directly into the Memory 24, or stored on the Secondary Storage 30 prior to loading into Memory 24 and execution.

Figure 2:
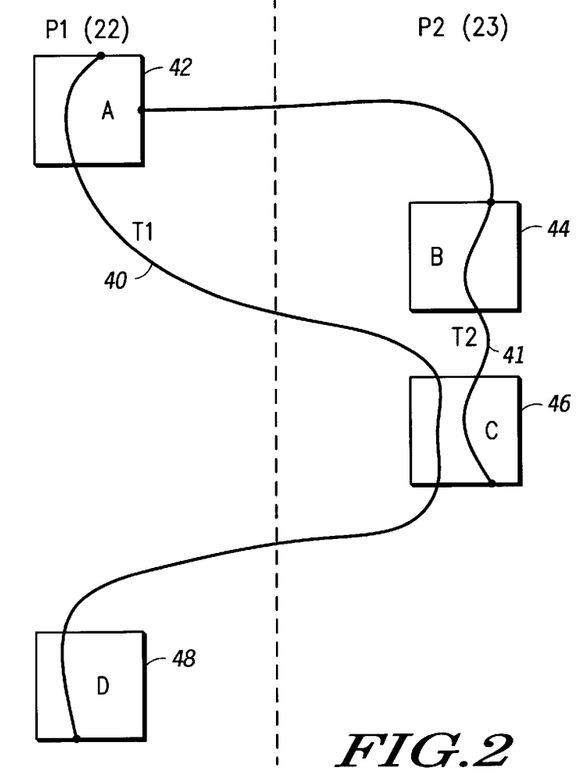
FIG. 2 is a block diagram that illustrates two threads of execution on a two processor system.

FIG. 2 is a block diagram that illustrates two threads of execution on a two processor system. Four basic code blocks are shown: A 42, B 44, C 46, and D 48. These threads of execution are shown: T1 40, and T2 41. Additionally the two processors P1 22, and P2 23 shown in FIG. 1 are also shown. The dotted line down the middle of FIG. 2 helps separate the execution of the two processors. Thread T1 40 starts execution in code block A 42 on processor P1 22. The thread is then switched by the operating system to run on processor P2 23 in code block C 46. It is then switched back by the operating system to execute on processor P1 22 where it terminates after executing code block D 48.

Meanwhile, thread T2 41 is started by thread T1 40 in code block A 42. It starts execution on processor P2 23 in code block B 44. The thread continues to execute on processor P2 23 and executes code block C 46, where it terminates. Note that it was never switched by the operating system to execute on the other processor.

Some representative context sets for the application in FIG. 2 are the following:

Context.Set 1: Entire Application
    Context:    {app} : A, B, C(twice), D
Context Set 2: Processors
    Contexts:    {P1} : A, D
                  {P2} : B, C (twice)
Context Set 3: Threads
    Contexts:    {T1} : A, C, D
                  {T2} : B, C
Context Set 4: (Thread, Processor) pairs
    Contexts:    {T1, P1} : A, D
                  {T1, P2} : C
                  {T2, P2} : B, C
Context Set 5: (Thread, Processor, Sequence) triplets
    Contexts:    {T1,P1[1]} : A
                  {T1,P2[1]} : C
                  {T1,P1[2]} : D
                  {T2,P2[1]} : B, C Thus, in case (1) above (entire application), one set of statistics would be generated, while in case (4) above (threads by processor) four sets of statistics could be generated.

Two processors P1 22, and P2 23, two threads T1 40, and T2 41, and four code blocks A 42, B 44, C 46, and D 48 are shown. It should be appreciated that this is illustrative only, and that the invention is designed to operate efficiently with larger numbers of processors, threads, and code blocks.

Figure 3:
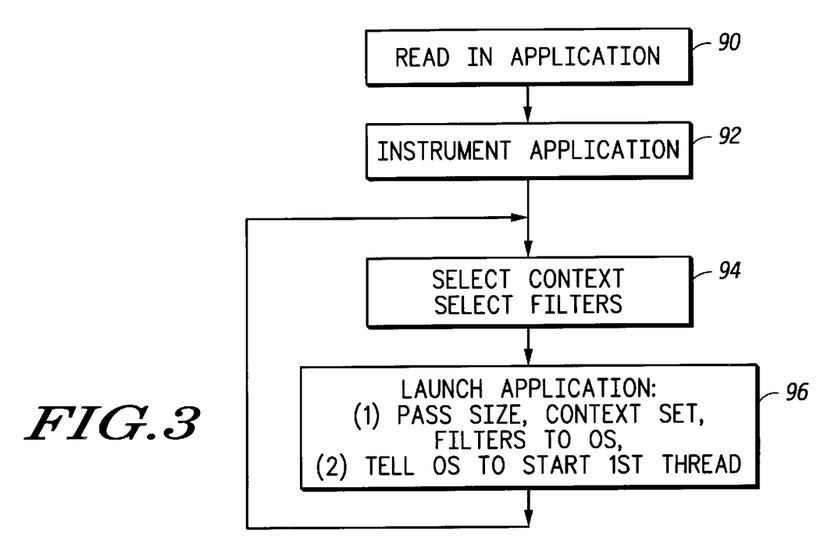
FIG. 3 is a flow chart that illustrates the main operation of the invention.

FIG. 3 is a flow chart showing the main operation of the invention. The application is read from disk, step 90. The application is then instrumented, step 92. A context set is selected, as are filters, step 94. The application is launched, in most instances by the operating system. The operating system (OS) is passed the size of the data area needed for each context set and the filters to be used. The OS starts the first thread in the application, step 96. This sequence can then be repeated, selecting another context set and filters, step 94 followed by again launching the application in step 96.

Figure 4:
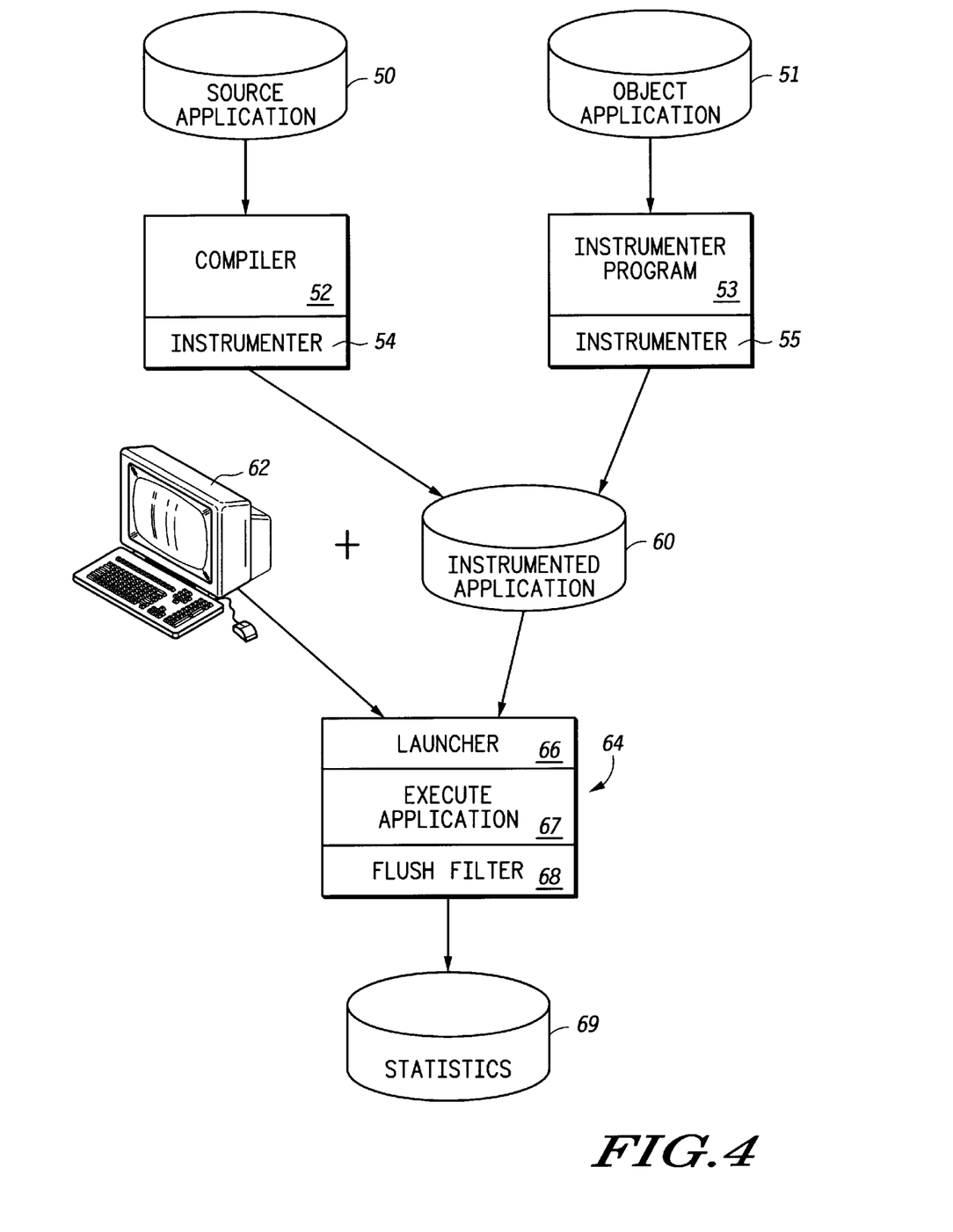
FIG. 4 is a block diagram that illustrates the operation of the invention shown in FIG. 3.

FIG. 4 is a block diagram that illustrates the operation of the invention shown in FIG. 3. In one instance, a source code application 50 is read by a compiler 52 and instrumentation code inserted 54 during compiler operation, generating an instrumented application 60. In another instance, an object code application 51 is processed by instrumentation program 53 which instruments code 55 and generates a new instrumented application 60. The instrumented application 60 is then launched and executed 64. The execution can be seen as actually having three different phases or parts. The launcher phase or code 66 takes its input for example from a terminal with a graphic user interface (GUI) interface 62. Alternatively, the input may be read from a file located on secondary storage. The input 62 specifies to the launcher 66 the context set to analyze, the size of the data area needed for each context and the filter functions to ultimately invoke. The application is then executed 67. A filter function is executed 68 at termination of the application, and whenever collected data for a particular context is determined to be complete during the execution of the application. The filter function generates statistics which may be stored in a disk file 69, stored in a secondary storage, or sent to a consumer, such as a pipe. Note that the filter function can be specified either by the instrumented application 60, or the execution input 62. This information may have been inserted by the compiler 52 or the instrumentation tool 53.

The launcher functionality 66 may be inserted in the system loader, or may be implemented with a "wrapper" around the application. This "wrapper" operates by notifying the operating system, usually via a system call, that instrumentation is to be activated, the context set for which collection is desired, and which filter to utilize. In either case, information can be inserted in the instrumented application 60 to allow the launcher 66 to know the types of instrumentation inserted. For example, in the case of profiling, the size of the data area to contain basic block counts would be inserted in the application 60 by the Instrumenting code 54, 55. The filter 68 can be either specified by the input execution input 62, or determined from the instrumented application 60. It can be viewed as a termination routine, invoked by the operating system when a block of instrumented data is complete. In profiling, for example, a set of counters might be written to disk or used to update a graphic display of control flow. In memory analysis, a set of memory reference information might be used to update a graphic display of memory usage. In tracing, a set of data might be written to a file.

Figure 5:
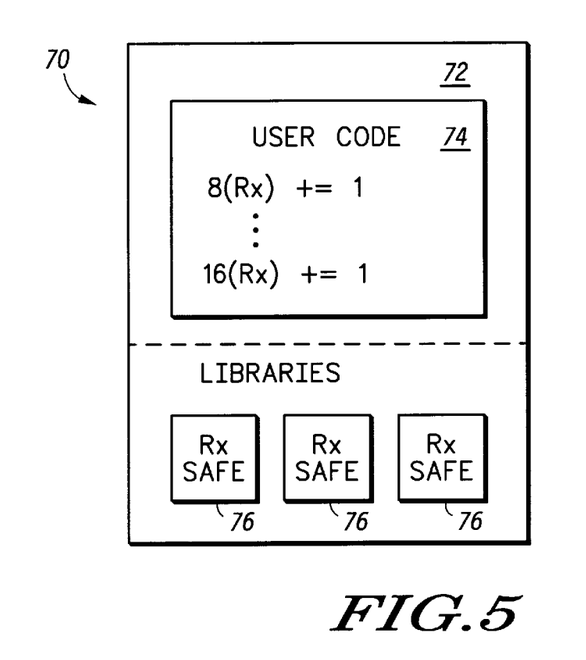
FIG. 5 and FIG. 6 are block diagrams that together illustrate the interaction between the application and the operating system.
Figure 6:
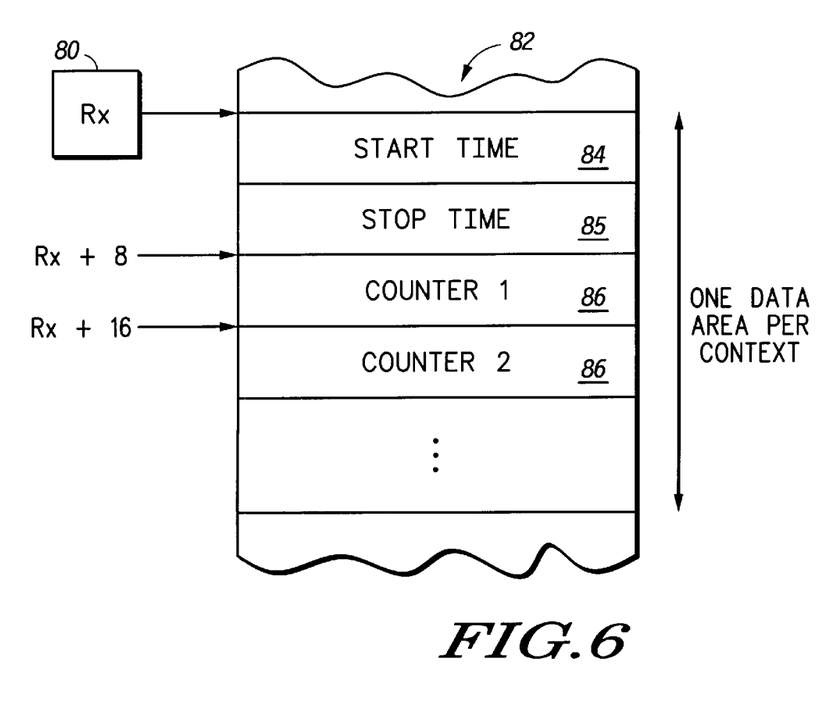

FIG. 5 and FIG. 6 are block diagrams that together illustrate the interaction between the application and the operating system. The application 70, contains user code 74 and library code 76. The instrumented user code 74 utilizes a reserved register or pointer (Rx) to address or point at an instrumented data area for the thread. The incrementing of two counters are shown in FIG. 5. These may correspond to counters inserted at the beginnings or ends of basic blocks in the user code. Each time the basic block code being instrumented is entered, one of the increment instructions is executed, incrementing one cell in the block of instrumented data addressed by the reserved register. The SAFE designation of the reserved register (Rx) in the libraries 76 indicates that register Rx cannot be used in the libraries except for instrumentation purposes. That of course is the definition of a reserved register. In the case of libraries, this restriction is necessary since execution of a library routine may be interrupted, and when restarted, may be part of a different context, and thus the register (Rx) may have been changed to address a different instrumentation data area.

FIG. 6 illustrates a buffer or block of memory 82 ("Instrumentation Data Area") set up by the operating system for use in collecting statistics, profiling information, traces, etc. The operating system initializes reserved register Rx 80 to address a location in the Instrumentation Data Area 82. In the case of profiling information, register Rx 80 will usually point at the start of Instrumentation Data Area 82, and offsets based on that register Rx 80 as shown in FIG. 5 can be used when incrementing basic block counts. Also the Instrumentation Data Area 82 may be time stamped, for example using start time 84 and stop time 85. Two counters 86 are shown being instrumented in the instrumented user code 74: the first increments 8+(Rx), and the second increments 16+(Rx). Profiling counters are shown in FIG. 5. Note also that such an Instrumentation Data Area 82 could be configured to contain buffer traces from or any other instrumentation data. In other words it may not be specifically restricted to profiling counts. In the case of buffer traces, the reserved register (Rx) 80 may be implemented to increment as trace data is stored in the Instrumentation Data Area 82. Finally, note that at least one data area is allocated per actual micro context encountered by the operating system while analysis mode is enabled. The use which is made of the Instrumentation Data Area may vary with the type of information which is being collected for analysis.

FIGS. 7–11 are flow charts that illustrate implementation of this invention in the operating system. As noted above, this can usually best be done by making appropriate modifications to the context switch sections of code in the operating systems being modified.

Figure 7:
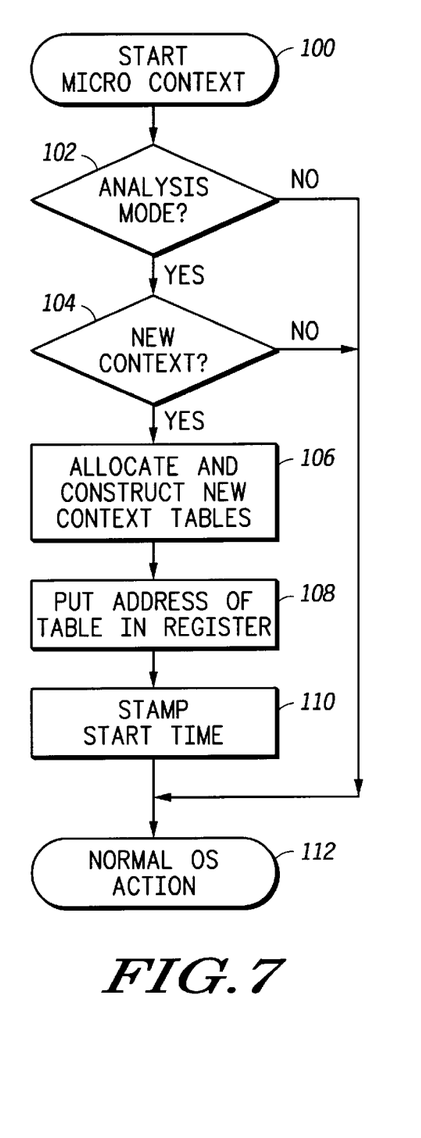
FIGS. 7–11 are flow charts that illustrate implementation of this invention in the operating system.

FIG. 7 is a flow chart that illustrates the operation of the operating system when a new micro context is started, such as when a thread is started, step 100. A check is made whether the application is in analysis mode, step 102. If not in analysis mode, step 102, the remainder of the flow chart is skipped. Otherwise a check is made as to whether this is a new context 104. If it is not a new context, normal thread initialization OS actions continue, step 112. Otherwise, with a new context, a new Instrumentation Data Area 82 for this context is allocated and constructed in step 106. The address of the Instrumentation Data Area 82 is placed in the reserved register (Rx) 80, step 108. Next, if time stamping is enabled, a start time stamp is placed in the Instrumentation Data Area 82, step 110. Finally, normal OS action for starting the micro context resumes, step 112.

Figure 8:
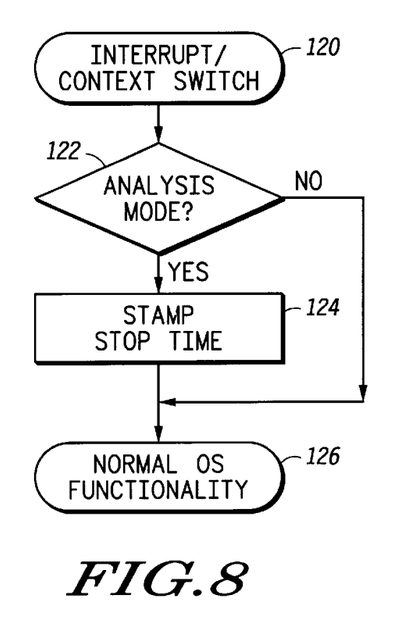

FIG. 8 is a flow chart that illustrates the operation of the operating system when a potential micro context switch is encountered, step 120. This is often triggered upon taking some asynchronous interrupt. Other situations that may trigger a potential context switch are operating system calls, expiration of a time slice timer, or indeed any other event that may cause a switch of context. A check is made whether analysis mode is active, step 112. The OS keeps a list of current contexts. If active, the buffer is time stamped as required, step 124. Normal OS functionality is then continued, step 126. This usually consists of ultimately placing the thread on a dispatch queue.

Figure 9:
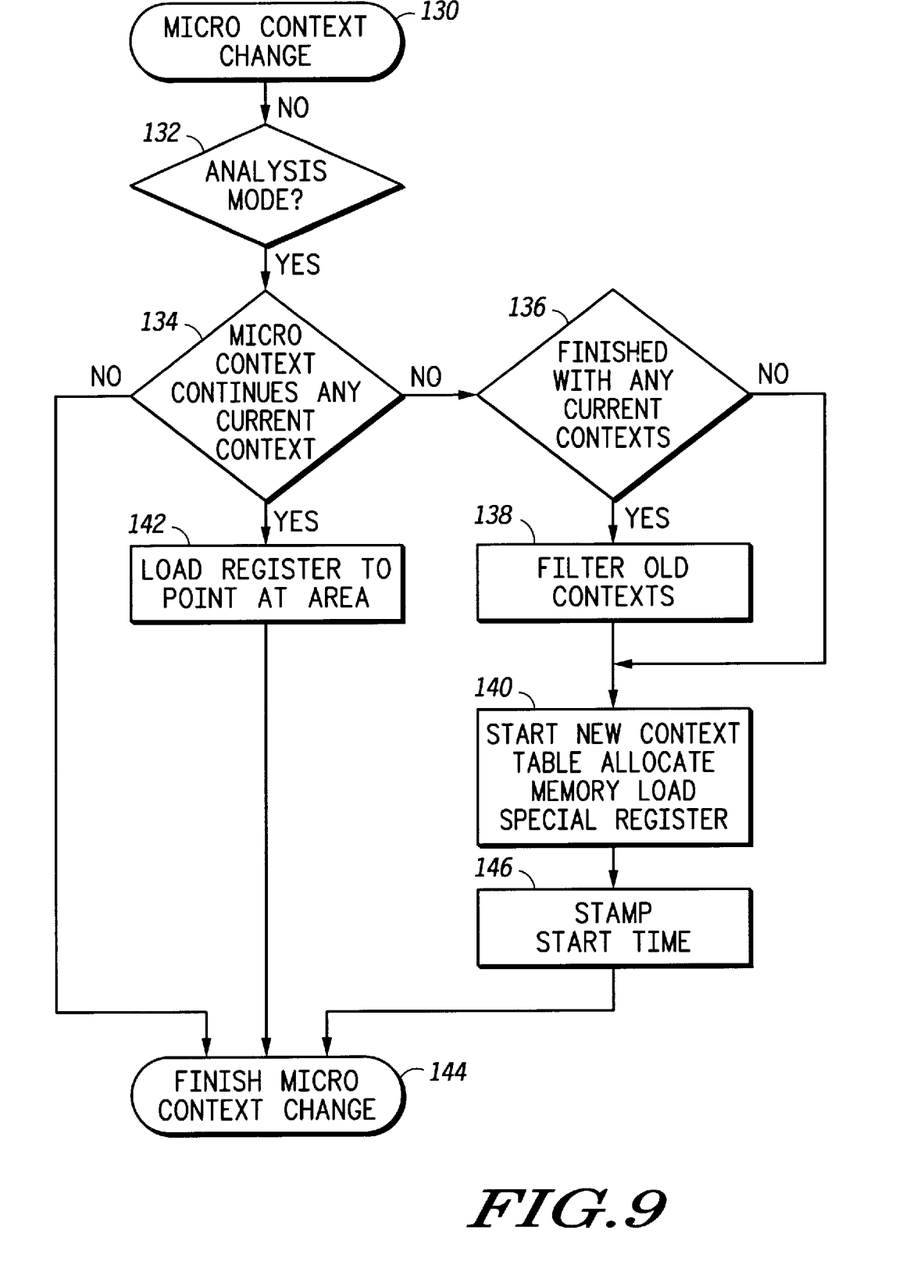

FIG. 9 is a flow chart that illustrates operation of the operating system upon change of micro context, such as dispatch of a thread, step 130. Analysis mode is checked, step 132. If analysis mode is not active for the application, step 132, normal dispatch logic is continued, step 144. Otherwise a check is made whether this micro context will fit into an existing context Instrumentation Data Area 82, step 134. If it cannot fit, step 134, a test is made whether the program is finished with an Instrumentation Data Area 82 for any contexts, step 136. If finished, step 136, the old Instrumentation Data Area(s) 82 are flushed in step 138 through the filter 68 is invoked. In either case, a new Instrumentation Data Area 82 for the context is allocated, and a special reserved register (Rx) 80 is loaded to address the Instrumentation Data Area 82, step 140. At this point, a start time stamp is given in step 146, and the normal operating system context-change code is rejoined, step 144. When the continued a current context, the special register (Rx) is initialized to address that context's Instrumentation Data Area 82, step 142, and normal dispatch operation is resumed, step 144.

Figure 10:
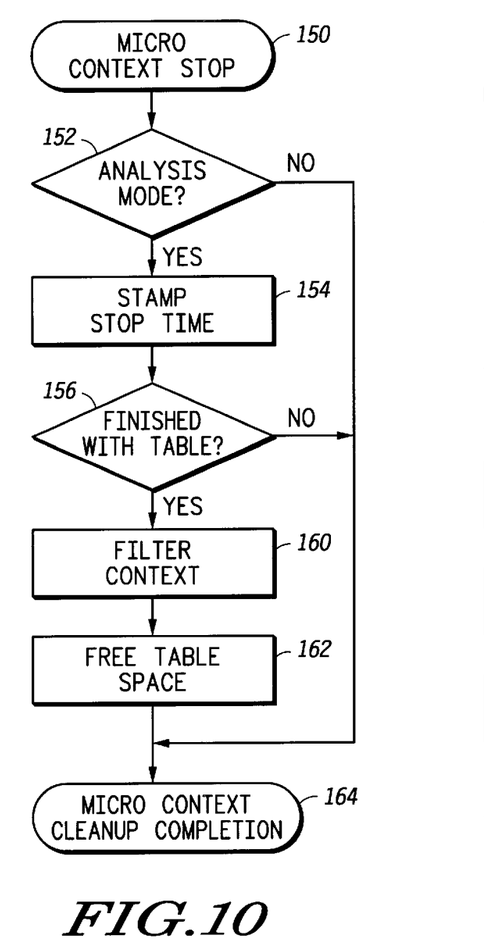

FIG. 10 illustrates operation in the operating system where a micro context stop is encountered, step 150. This happens, for example, at the end of a thread or ft the end of the application itself. Analysis mode is checked, step 152. If not in an analysis mode, step 152, the normal OS clean up code is resumed, step 164. Otherwise, if time stamping is enabled the current table is stamped complete, step 154. A test is made whether the current Instrumentation Data Area 82 is finished, step 156. If use of the current Instrumentation Data Area 82 is not finished, step 156, normal OS contacts clean up is resumed, step 164. Otherwise a filter 68 is invoked to process the Instrumentation Data Area 82, step 160. Next, the memory for the-current Instrumentation Data Area 82 is de-allocated, step 162 and normal OS clean up is resumed, step 164.

As noted above, the filter 68 module is a function or procedure invoked to process completed Instrumentation Data Area 82 buffers. As such, its function depends on the ultimate use to be made of the buffers. If the collected statistic is basic block counts, then the filter 68 may be used to combine statistics from different sources. For example, on an architecture without an atomic increment instruction, it may be more efficient to utilize one Instrumentation Data Area 82 per processor than to utilize locking around increment sequences. Another use of the filter 68 module is to filter out, or ignore certain statistics. Alternatively, if instruction traces are generated, the filter 68 module may be utilized to implement a pipe structure, allowing the traces to be reviewed in real-time. These examples are illustrative only, and should not be taken as limitations on the functionality that can be implemented in filter 68 modules invoked to consume completed Instrumentation Data Area 82 buffers.

The final operating system enhancements concern planned exception processing. In a case of instruction traces, the actual trace information does not conveniently fall into fixed size buffers or blocks. Rather, it is essentially continuously generated. The solution shown here is to store traces in a Instrumentation Data Area 82 addressed by reserved register (Rx) 80. The register can be incremented every time trace information is placed in the Instrumentation Data Area 82. This trace information can be addresses, or instructions executed, register contents, or instructions executed. If the reserved register (Rx) 80 is incremented each time data is inserted into the Instrumentation Data Area 82, ultimately reserved register (Rx) 80 will increment off the end of the Instrumentation Data Area 82. Operating systems with modern hardware can be programmed to generate an interrupt at this point. This is usually some sort of memory fault memory address or fault or the like.

Figure 11:
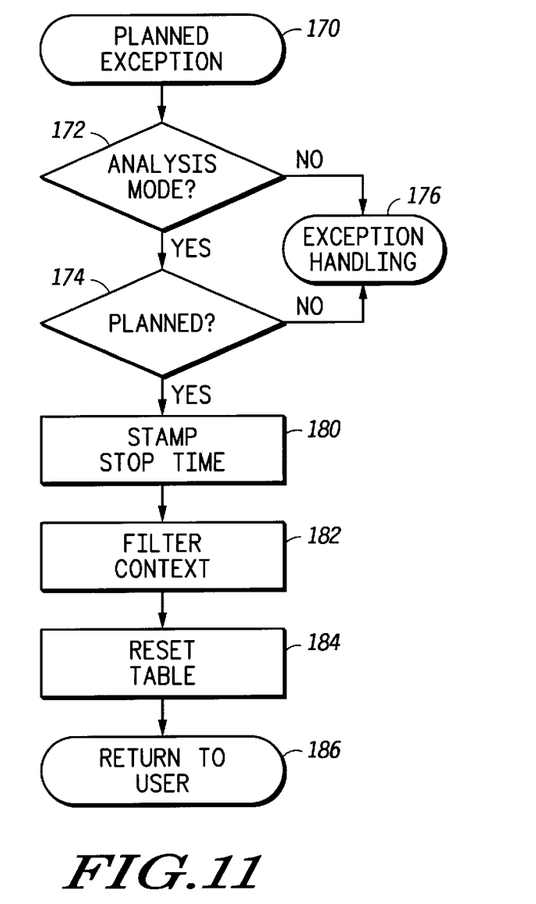

FIG. 11 is a flow chart illustrating implementing planned exception processing in the operating system. When one of these planned exceptions is raised, step 170, an interrupt routine is entered. Analysis mode is checked, step 172 and if not active, standard exception handling is invoked, step 176. Otherwise, a test can be made whether this is a planned exception, step 174. This is to distinguish between the planned exception, and the type of error exception that the interrupt being used was designed to capture. Depending on the underlying hardware architecture, a test may be made whether the interrupt or the offending address in an addressing exception is right after the assigned Instrumentation Data Area 82. If it is not a planned exception, step 174, normal exception handling is invoked, step 176. Otherwise, the user program has filled the Instrumentation Data Area 82 with data. This may have happened when the register (Rx) 80 was incremented off the end of the assigned Instrumentation Data Area 82. In any case, if time stamping is enabled, the Instrumentation Data Area 82 is time stamped out, step 180. Next, the filter routine 68 is invoked for the current Instrumentation Data Area 82, step 182. The table index to the start of the trace table in the Instrumentation Data Area 82 is reset, step 184. If for example, the trace table in the Instrumentation Data Area 82 is filled by incrementing reserved register (Rx) 80, the reserved register (Rx) 80 is reset to point at the beginning of the trace table. In any case the operating system can then either return control directly back to the user program, step 186, or put the thread in the dispatch queue for later dispatch.

An important issue is the atomicity of operations acting on an Instrumentation Data Area. Preserving atomicity is easier when the architecture supports atomic update instructions across processors. If that support is not provided, a solution is to keep a separate Instrumentation Data Area for each processor. This reduces the preservation of atomicity to the level of a single processor, and provides no additional overhead when the context set distinguishes among processors. Separate Instrumentation Data Areas used by different processors may be combined at a filtering or later time if the context set doesn't distinguish among processors. Atomicity on a single processor may require, in some systems, snooping to determine whether an interrupted microcontext was in the middle of updating a counter. Since this is snooping is required only at micro context changes and not each time instrumentation code is run, it has low overhead.

In conclusion, some of the advantages of the invention disclosed herein are that it:

extends prior basic block counting and profiling to handle multithreaded and multiprocessor environments where each piece of work has a context that records the basic block counting activity. The amount of memory required will be significantly less than required for collecting full event traces in the methods currently used in multiprocessor environments.

provides a versatile and efficient mechanism for changing the context set to be used in collecting data for a specific execution of an application without altering the application code itself.

provides an efficient mechanism for flushing and filtering contexts when their data has been completed. The filter can make summary use of the data in real-time, and discard it or can simply write the collected data to permanent storage.

provides a minimal cost (single-context) means of executing an already-instrumented application when no instrumentation information is actually desired.

provides a means of finding context-specific information without carrying out a complete trace.

allocates space only for those contexts which actually arise during the particular execution of the application.

permits output for a given context to be filtered, compressed, summarized, or otherwise processed as soon as the collection for that context ends.

Part of the value of this invention is that it permits the collection of statistics on multithreaded and multiprocessed applications without having to add any instrumentation code over the uniprocessor case. This saves time and space. Also, the context being profiled can be changed dynamically from run to run without any need for program modification: the very same instrumentation code that is used for a uniprocessor system can be used without modification on a multiprocessor/multithreaded system.

Those skilled in the art will recognize that modifications and variations can be made without departing from the spirit of the invention. Therefore, it is intended that this invention encompass all such variations and modifications as fall within the scope of the appended claims.

We claim:

1. A method for multiple context analysis of a software application in a computer system, wherein:

the computer system is characterized as being a multiprocessor computer system, and said method comprising the steps of:

providing an instrumented software application;

selecting a context set to characterize a level of analysis to be applied to the instrumented software application; and launching the instrumented software application to produce an output for determining a usage of computer system resources by each context in the context set.

2. A method for multiple context analysis of a software application in a computer system, comprising the steps of:

providing an instrumented software application;

selecting a context set to characterize a level of analysis to be applied to the instrumented software application; and launching the instrumented software application to produce an output for determining a usage of computer system resources by each context in the context set, wherein:

the output is used to automatically restructure the software application to make better use of the computer system resources.

* * * * *